(No Model.)
R. W. PERRY.
PIE CRUST CLAMP.
No. 340,152. Patented Apr. 20, 1886.
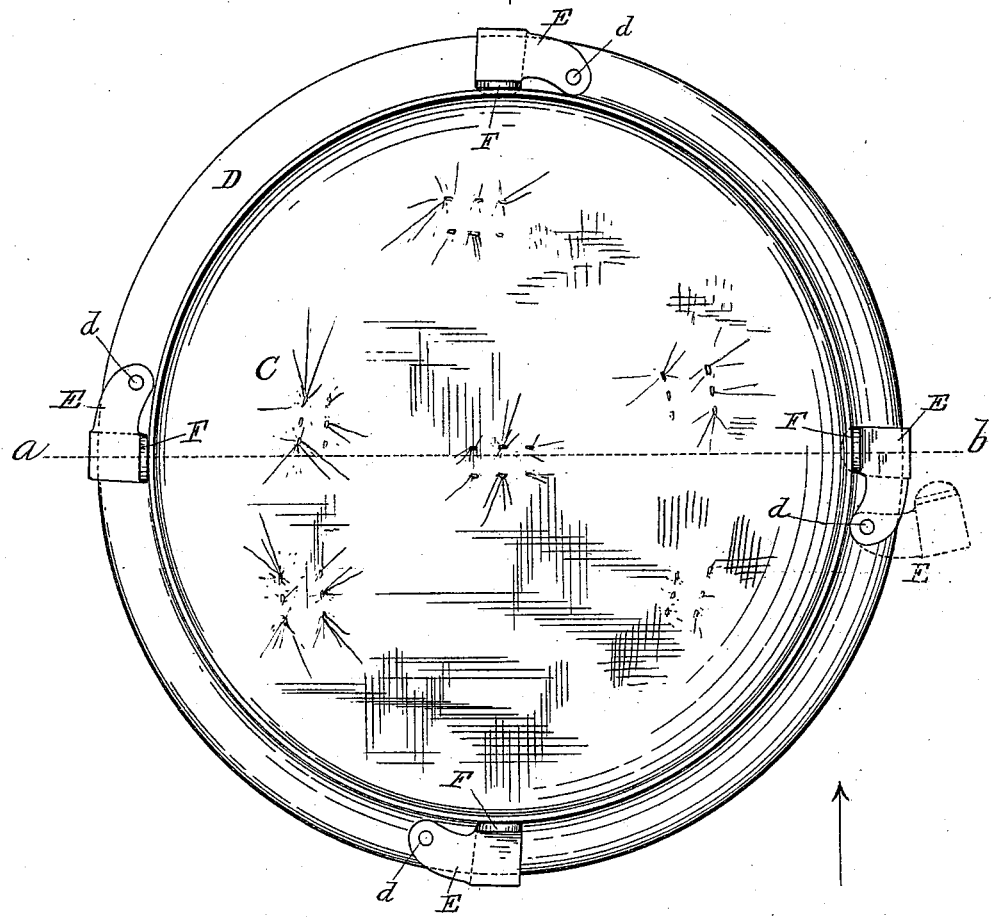
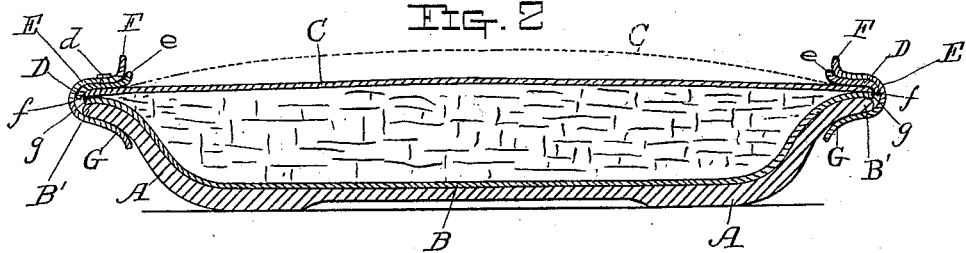
Witnesses:
Thos. H. Dodge
Henry L. Miller
Inventor:
Reuben W. Perry

UNITED STATES PATENT OFFICE.

REUBEN W. PERRY, OF SAUNDERSVILLE, MASSACHUSETTS.

PIE-CRUST CLAMP.

SPECIFICATION forming part of Letters Patent No. 340,152, dated April 20, 1886.

Application filed May 21, 1885. Serial No. 166,240. (No model.)

*To all whom it may concern:*

Be it known that I, REUBEN W. PERRY, of Saundersville, in the county of Worcester and Commonwealth of Massachusetts, have invented certain new and useful Improvements in Pie-Crust Clamps; and I do hereby declare the following to be a full and clear description of the same, reference being had to the accompanying drawings and letters of reference marked thereon, forming a part of this specification, and in which—

Figure 1 represents a top or plan view of a plate and pie thereon, having my pie-crust clamp arranged in position for baking a pie, as will be hereinafter more fully described; and Fig. 2 represents a vertical central section on line *a b*, Fig. 1, looking in the direction of the arrow.

To enable those skilled in the art to which my invention belongs to make and use the same, I will proceed to describe it more in detail.

The nature of my invention consists in a circular pie-crust clamp provided with movable pieces, whereby the circular clamping-piece may be drawn down upon the edge of the upper pie-crust, thereby clamping the edges of both the upper and under pie-crust tightly together and against the outer upper edge of the pie-plate.

In the drawings, the part marked A is the pie-plate, B the lower pie-crust, and C the upper pie-crust, the pie material being represented by irregular horizontal and vertical lines in Fig. 2.

To the upper side of the pie-crust clamping-ring D are secured a series of holding or gripping fingers, E, by means of pivots *d*, each finger E being provided in this instance with a thumb-piece, F, and a spring-clamp projection, G. In this instance the circular or ring pie-crust clamp-piece is made with an upward curve or bend, *e*, on its inner edge and with a downwardly-curved part, *f*, on its outer lower edge; but the form of the part D may be varied both in form and construction without departing from the principle of my invention.

The operation is as follows: The lower pie-crust, B, is placed in position on the pie-plate A in the usual manner, then the pie material is filled in, after which the upper pie-crust, C, is placed on the pie material with its outer edge resting on the outer edge of the lower pie-crust, both being supported by the outer edge, B', of the rim of the pie-plate A, after which the outer edges of both pie-crusts are trimmed off, and then the pie-crust clamp piece D is placed in position on the outer edges of the pie-crusts, the thumb-pieces F, with their spring-clamp projections G being turned out, as shown in dotted lines, Fig. 1, to permit the part D to be quickly placed in position, after which the parts F and G are turned back, as shown in full lines, Figs. 1 and 2, the spring-clamping projections G being forced under the rim of the pie-plate B', thereby drawing the pie-crust clamping-ring D down upon the edges of the pie-crusts, which are held tightly together upon the outer edge of the rim B' of the pie-plate A, as indicated at *g'*, Fig. 2. The pie is now placed in the oven and baked, after which, the parts E and G being turned out, as indicated in dotted lines, Fig. 1, the clamping pie-crust rim D is easily removed.

My invention enables the cook to make the pie-crusts very thin, while at the same time it prevents all liquid and moisture from the pie material escaping and running out and over the edges of the pie-plate, and as a result the pies are more juicy and palatable, and besides the burning and smoking of the liquid from the pies while baking, when made in the ordinary way, does not trouble the cook when my pie-crust-clamping device is employed.

The pies, when made with the use of my invention, are more full and plump with the same material than when made in the common way, while at the same time a great saving is made in the material of which the pie-crust is made. Then, again, the time saved in cleaning the pie-plates and the oven-bottoms when my invention is used is a matter of great practical importance.

In practice the juice of the pie may, during the process of baking, force the upper pie-crust, C, up, as indicated in dotted lines, Fig. 2, and yet it will be prevented from escaping in consequence of the edges of the pie-crust being so closely clamped and pressed together.

Having described my pie-crust-clamping device, what I claim therein as new and of my invention, and desire to secure by Letters Patent, is—

1. A pie-crust-clamping ring, in combination with clamping or holding fingers for securing it to the edge of the pie-plates, substantially as described.

2. The combination, with the pie-crust-clamping ring D, provided with curved edges $e$ and $f$, of gripping or holding fingers E, provided with clamping projections G, substantially as and for the purposes set forth.

REUBEN W. PERRY.

Witnesses:
THOS. H. DODGE,
HENRY L. MILLER.